UNITED STATES PATENT OFFICE.

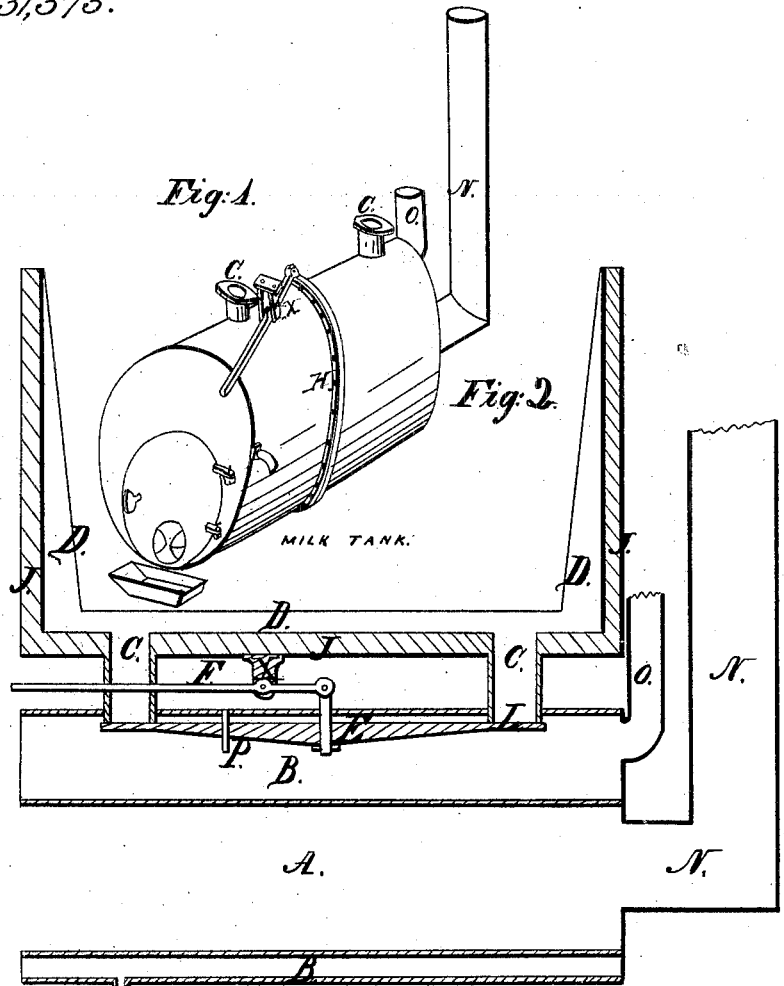

HOWELL COOPER, OF WATERTOWN, NEW YORK.

HEATER FOR CHEESE-VATS.

Specification of Letters Patent No. 31,373, dated February 12, 1861.

*To all whom it may concern:*

Be it known that I, HOWELL COOPER, of Watertown, in the county of Jefferson and State of New York, have invented a new and useful Improvement on Cheese-Vat-Heating Arrangements; and I do hereby declare that the following is a full, clear, and exact description of the construction and operation of the same, reference being had to the annexed drawings, making a part of this specification, in which—

Figure 1 is a perspective view of the heater, Fig. 2 a longitudinal sectional elevation of the heater and transverse section of the vat, Fig. 3 a plan of valves and bar connecting them.

In said drawing A Fig. 2 is the fire box made of sheet copper or other metal, and placed within an iron shell formed of two parts, being joined together by bolts as shown at H Fig. 1.

B Fig. 2 is the water space around the fire box.

C, C, are pipes leading from the heater to the vat, the lower end of them forming valve seats.

D the water space in the vat (surrounding the milk tank) which is connected with the water in the heater by the pipes C, C.

O is a pipe at the back end and outside of the heater extending above the surface of the water in the vat, to permit the escape of steam which may be generated in the heater.

J, J is the shell of the vat to the bottom of which are attached the pipes C, C, the latter having flanges for that purpose.

E is a bar placed in the water space within the heater, constructed as shown in Figs. 2 and 3; having on each end a circular, flat surface L acting as valves, covering the apertures C, C. To the center of the bar E there is attached the rod 1, which works through the upper part of the heater shell.

At points on either side between the center of the bar E and the valves L, or at the ends of the bar are holes made vertically through the bar as shown at R Fig. 3 to receive one or more steady pins (P Fig. 2) which are fastened to the heater shell, or places fitted on the bar to work in guides, either of which keep the valves in a line with the pipes C, C.

F is a lever attached to the upper end of the rod 1 moving on a fulcrum formed by an iron *x* attached to the bottom of the vat or to the top of the heater shell.

K is a cock at the bottom of the heater to draw off water when required.

One of the objects of my improvement is, to regulate the temperature of the water in the vat, and to preserve warm water in the heater to wash and clean the implements when the work is done. In the process of cheese making the milk is brought to a temperature (from 80° to 85° Fahrenheit) sufficient to form the curd, when it is desired to have that temperature maintained for a space of time, which I effect by closing the valves in the heater, after which a higher degree of temperature is required, which is readily effected by opening the valves. When the curd is in a proper state the valves are closed and the warm water drawn from the vat, and to cool it ready for the press, cold water is substituted in its place in the vat, while the pressure of the hot water in the heater will keep the valves firmly closed, which experience has shown will not be the case where the hot water presses against the face of the valve. After the work of cheese making is done, the hot water can be drawn from the heater for washing purposes.

Thus my improvement materially differs from other cheese vat heating arrangements, some of which have employed a separate heater or reservoir in addition to the ordinary or main heater to act as a reserve for regulating the temperature in the vat and for cleaning the pans and other implements used in cheese making. Thus my invention not only differs therefrom in dispensing with such extra contrivances while it accomplishes the regulation of the temperature in the vat as perfectly or more so than where a separate reserve of heated water is adopted, but it importantly differs therefrom in the arrangement and action of the valves, not simply in the particular before mentioned, by having both valves to close against the cold or cooler water in the vat, but in the arrangement of the valves within the heater or water space around the fire box instead of outside of the heater or instead of within the vat and hot water reserve. The pressure or tendency to expansion of the hot water in the heater causes a tighter or more effectual closing of the valves, and by the disposition of the valves and the water passages which they close on opposite sides of the vat, a more equable distribution and regulation of heat is effected to or around the vat. Likewise as both valves are exposed to like pressures or conditions of the fluid both being exposed at their backs to the water in the heater, and at their faces to the water of the vat space, they at all times balance or may balance each other which facilitates the opening and closing of the valves and renders more certain or tight their action. These and other points of difference as shown in the previous description and the drawing invest my improvement with more than ordinary novelty and utility.

And now having described my improvement, I claim:

1. The combination with the heater and vat of a valve or valves arranged within the heater and so as to close against the water in the vat or pipe or pipes leading from the heater thereto substantially as specified.

2. The employment of two or more valves in connection with the heater and vat, arranged to control the supply to the vat on opposite sides of it essentially as set forth.

3. So arranging the valves which control the supply of hot water to the vat as that they balance each other and are exposed on their respective faces and backs to like conditions of the fluid in the heater and vat, substantially as specified.

HOWELL COOPER.

Witnesses:
MYERS THOMPSON,
CHAS. F. SMITH.